US011881607B1

(12) United States Patent
Wrigley

(10) Patent No.: US 11,881,607 B1
(45) Date of Patent: Jan. 23, 2024

(54) LONGITUDINALLY RIDGED SEPTUM ORTHOMODE TRANSDUCER POLARIZER

(71) Applicant: Lockheed Martin Corporation, Bethesda, MD (US)

(72) Inventor: Jason Stewart Wrigley, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 73 days.

(21) Appl. No.: 17/494,286

(22) Filed: Oct. 5, 2021

(51) Int. Cl.
*H01Q 13/02* (2006.01)
*H01P 1/16* (2006.01)
*H01P 1/161* (2006.01)
*H01P 3/123* (2006.01)

(52) U.S. Cl.
CPC .............. *H01P 1/161* (2013.01); *H01P 3/123* (2013.01); *H01Q 13/0258* (2013.01)

(58) Field of Classification Search
CPC .... H01Q 13/0258; H01Q 13/02; H01Q 15/24; H01P 1/16; H01P 1/161; H01P 1/17; H01P 1/171; H01P 1/173; H01P 1/06; H01P 1/066; H01P 5/12
See application file for complete search history.

(56) References Cited

U.S. PATENT DOCUMENTS 3,958,193 A * 5/1976 Rootsey .................... H01P 5/12 333/125
4,039,975 A * 8/1977 Debski ...................... H01P 5/20 333/122
4,761,625 A * 8/1988 Sharma ................. H01P 1/2016 333/33
6,201,508 B1 * 3/2001 Metzen .............. H01Q 13/0258 343/778
9,478,838 B2 10/2016 Wolf et al.
10,096,876 B2 * 10/2018 Jensen .................... H01P 3/123
11,437,727 B2 * 9/2022 Boin .................. H01Q 13/0241
2003/0067367 A1 * 4/2003 Volman ................... H01P 1/172 333/125
2022/0190477 A1 * 6/2022 Girard ..................... H01P 3/123

OTHER PUBLICATIONS

Bornemann, Jens et al., "Septum Polarizer Design for Antenna Feeds Produced by Casting," IEEE Antennas and Propagation Society International Symposium 1997, 4 pages, Jul. 13-18, 1997.
Chen, Yen-Lin et al., "A 77-118 GHz Resonance-Free Septum Polarizer," The Astrophysical Journal Supplement Series, vol. 211, No. 11, 11 pages, Mar. 2014.
Steban, Jaime et al., "Field Theory C.A.D. of Septum OMT-Polarizers," IEEE Antennas and Propagation Society International Symposium 1992, 4 pages, Jun. 18-25, 1992.
Microwaves101, "Double-Ridged Waveguide," https://www.microwaves101.com/encyclopedias/double-ridged-waveguide, 3 pages, Oct. 5, 2021.

* cited by examiner

*Primary Examiner* — Tho G Phan

(57) ABSTRACT

A septum orthomode transducer polarizer (SPOL) is presented comprising sidewall ridges which increase bandwidth in the presence of draft angles for injection molding manufacturing techniques. A SPOL with sidewall ridges is able to accommodate draft angles for injection molding while creating greater modal separation within the SPOL and increasing the resultant bandwidth. A horn aperture may be included with the SPOL, and the combined structure may be injection molded as a single part to realize significant cost and mass reductions.

17 Claims, 11 Drawing Sheets

LONGITUDINALLY RIDGED SEPTUM ORTHOMODE TRANSDUCER POLARIZER

TECHNICAL BACKGROUND

Orthomode transducers (OMTs) and polarizers are components employed in wireless transmission systems that employ waveguide structures. An OMT separates or combines orthogonal (e.g. vertical and horizontal) signal polarizations among different ports from a common or shared port. A polarizer can convert a polarization of signals between linear and circular polarizations, among other configurations. Both of these components can be combined to form a structure called an OMT-polarizer. OMT-polarizers are often employed in satellite communication system feeder structures which utilize microwave radio frequency (RF) signals, and can be installed in communication uplinks and downlinks. However, waveguides and associated OMT-polarizers can be difficult to design and manufacture due in part to the high sensitivity of feeders and waveguides to manufacturing precision, symmetry, and geometric configurations which can lead to distortions like passive intermodulation. Moreover, the OMT-polarizer structure itself can have bandwidth limitations related to particular geometries and manufacturing techniques.

One example OMT-polarizer type is the septum OMT-polarizer. A septum OMT-polarizer includes a conductive 'septum' which spans through a waveguide at the midplane, dividing a waveguide having a common or shared port at one end into two ports at the other end. The septum can employ a geometry having a series of stepped discontinuities to convert a circularly polarized signal received at the common input port of the OMT-polarizer into two linear polarization signals at two output ports of the OMT-polarizer. However, septum OMT-polarizers suffer from limited bandwidths. Furthermore, when casting or molding is employed to manufacture a septum OMT-polarizer, draft angles are included on the internal waveguide cavities and associated features, such as the septum, to slope cross-sectional areas along a target axis. These draft angles are typically a requirement of the manufacturing process to prevent material overhangs or parallel surfaces in order to release the workpiece from a mold or die. Unfortunately, the use of draft angles further reduces bandwidths of septum OMT-polarizers, making use of such septum OMT-polarizers unsuitable for many applications, such as broadband electronically steerable arrays (ESAs).

Overview

Provided herein are various enhancements for radio frequency (RF) waveguides, feeder structures, and septum orthomode transducer (OMT) polarizers (SPOLs) with can be employed in horn antenna arrangements. Specifically, enhanced septum OMT-polarizers are shown which can be employed in horn antennas or arrays capable of transmitting or receiving radio frequency signals. These examples provide low-cost, high-performance, and mass-producible dual polarization septum OMT-polarizers that can be formed using injection molding processes, while achieving double the bandwidth of the traditional approaches when draft angles are employed during manufacturing. Sidewall ridges are positioned within the septum OMT-polarizers which establish greater separation between waveguide propagation modes and a higher bandwidth is thus achieved. Moreover, the enhanced septum OMT-polarizers produced using an injection molding process can have reduced mass when compared to a traditional aluminum machined horn polarizers, while reducing fabrication costs by an order of magnitude.

A first example apparatus related to enhanced septum OMT-polarizers includes a waveguide cavity having two signal ports at a first end and a common port at a second end. A septum element is disposed in the waveguide cavity between the two signal ports and has a series of step downs extending longitudinally from the first end. Also included in the apparatus are ridge elements positioned on opposing side walls of the waveguide cavity that extend longitudinally from the first end along the opposing side walls.

An example method of manufacturing a septum orthomode transducer polarizer includes forming a waveguide cavity having two signal ports at a first end and a common port at a second end, and forming a stepped septum element in the waveguide cavity between the two signal ports that extends for a selected longitudinal length along the waveguide cavity. The method also includes forming two ridge elements on opposing side walls of the waveguide cavity that extend from the first end for the selected longitudinal length along the opposing side walls.

In another implementation, an antenna array includes a plurality of horn antennas each having a horn element coupled to a septum orthomode transducer polarizer at a common port. Each septum orthomode transducer polarizer comprises a waveguide cavity with two signal ports at a first end and the common port at a second end, a septum element disposed in the waveguide cavity between the two signal ports and comprising a series of step downs extending longitudinally from the first end, and ridge elements positioned on side walls of the waveguide cavity and extending longitudinally along the side walls from the first end.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Provided herein are various enhancements for radio frequency (RF) waveguides, feeder structures, and septum orthomode transducer (OMT) polarizers (SPOLs) with can be employed in horn antenna arrangements. Horn antenna arrangements and associated equipment are often deployed in reflector feed structures as well as electrically steerable arrays (ESAs). When injection molding or casting techniques are employed to manufacture a septum OMT-polarizer or associated horn structures, draft angles are included to slope cross-sectional areas along certain axes. These draft angles are typically a requirement of the manufacturing tooling or process to prevent material overhangs or parallel surfaces in order to release the workpiece from a mold or die. The use of draft angles affects mode cutoffs and reduces bandwidths of septum OMT-polarizers, making usage of septum OMT-polarizers that have draft angles unsuitable for many applications, such as broadband ESAs. The enhanced septum OMT-polarizers discussed herein can be produced using injection molding processes, and can have reduced mass when compared to a traditional aluminum machined horn polarizers, while reducing fabrication costs by an order of magnitude. Thus, low-cost, high-performance, and mass-producible dual polarization septum OMT-polarizers can be formed using the techniques herein, while achieving double the bandwidth of the traditional approaches when draft angles are required by manufacturing processes. The septum OMT-polarizers discussed herein include sidewall ridges positioned within the associated waveguide cavities, which establish greater separation between waveguide propagation modes and a higher bandwidth is thus achieved. These sidewall ridges can be included within injection-molded septum OMT polarizers manufactured with draft angles.

Figure 1:
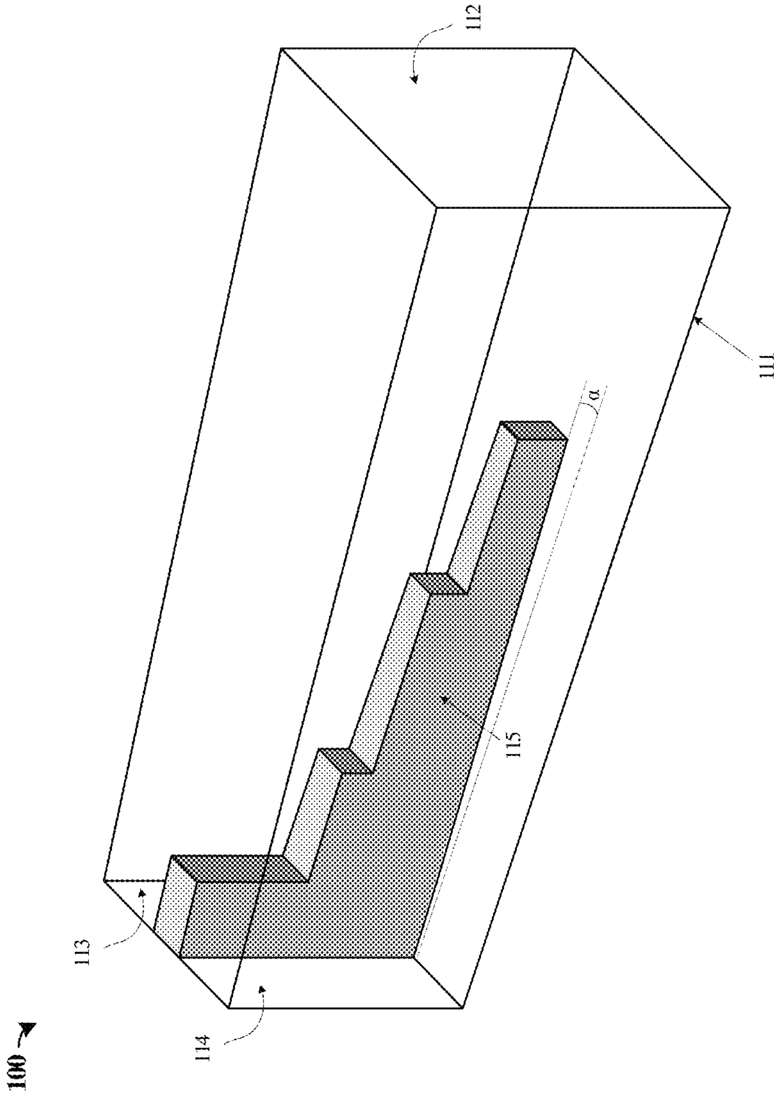
FIGURE 1 prior art
FIG. 1 illustrates an example septum polarizer in an implementation.

As a prior example of a septum OMT-polarizer, FIG. 1 is presented. FIG. 1 is an isometric wireframe view of septum OMT-polarizer 100. Septum OMT-polarizer 100 includes waveguide 111, common aperture 112, and ports 113-114 which are separated by septum 115. Draft angle $\alpha$ is shown for septum 115, and this angle can be reflected in other features of septum OMT-polarizer 100, such as walls of waveguide 111. While angle $\alpha$ can be approximately 1 degrees, the particular angle used can be selected based on the manufacturing process and typically is minimized for a particular process. Septum 115 includes a series of step-down features which reduce a height of septum 115 from an initial height to ultimately merge with the associated surface (floor) of waveguide 111. The quantity, length, and configuration of the septum step features can vary based on application and target performance characteristics for septum OMT-polarizer 100. The heights of the step-down features are sloped to accommodate the draft angle, as well as the width of septum 115. As mentioned above, the use of draft angles in a septum OMT-polarizer, such when formed using injection molding processes, impacts propagation mode cutoffs and reduces bandwidths to a point where the usability of such a septum OMT-polarizer is very limited.

In operation, septum OMT-polarizer 100 can be employed to propagate an RF signal over a longitudinal axis from ports 113-114 to common aperture 112, or vice-versa. Typically, septum OMT-polarizer 100 will be coupled via the common aperture to a horn structure or other aperture antenna structure, and coupled via ports 113-114 to transmit/receive circuitry and related RF elements. During receive operations, the structure and shape of septum OMT-polarizer 100 separates an incoming signal received at common aperture 112 into signal portions having different polarizations, namely right-hand circular polarization (RHCP) at port 113 and left-hand circular polarization (LHCP) at port 114. The incoming signal might have a combination of the TE10 and TE01 modes, and septum OMT-polarizer 100 combines these modes for propagation to individual ports 113-114. Since each of ports 113-114 are coupled to separate waveguides which represent both right hand and left hand circular polarization, the associated signal portions propagate separately to circuitry and RF elements which handle the corresponding portion. A similar operation is established for transmit operations, where a RHCP signal at port 113 and a LHCP signal at port 114 propagate longitudinally along septum OMT-polarizer 100 and the signals are combined along the path toward common aperture 112.

A traditional septum OMT-polarizer which contains no draft angles can achieve approximately 12% bandwidth while maintaining than better than around 0.50 dB axial ratio. The bandwidth is limited by the separation between the dominant mode cutoff (e.g. mode TE10) at source ports and degenerate mode cutoffs at the common aperture (e.g. modes TM11/TE11). When draft angles required by injection molding are introduced to the traditional approach, such as seen in FIG. 1, the separation between the dominant TE10 and degenerate TM11/TE11 modes is greatly reduced thereby limiting the achievable bandwidth (e.g. 29.2 to 31.0 GHz). More specifically, the TE10 cutoff moves up in frequency while the TM11/TE11 cutoffs move down in frequency due to the draft angles altering the geometry of the waveguide as associated structures.

Discussed herein are several example implementations of enhanced septum-OMT polarizers with sidewall ridges that establish greater modal separation between the TE10 and TM11/TE11 mode cutoffs. Draft angles can thus be readily employed with a higher achievable bandwidth (e.g. 27.0 to 31.0 GHz). More specifically, the addition of the sidewall ridges enables a greater frequency separation between the dominant TE10 and degenerate TE11/TM11 mode cutoffs, as compared to having no sidewall ridges. While the Ka microwave RF band is discussed herein, other frequency ranges for other RF bands can be achieved with similar ridged features, but having appropriately sized waveguide geometry, such as for 7.25 to 8.40 GHz or 17.7 to 20.2 GHz.

Figure 2:
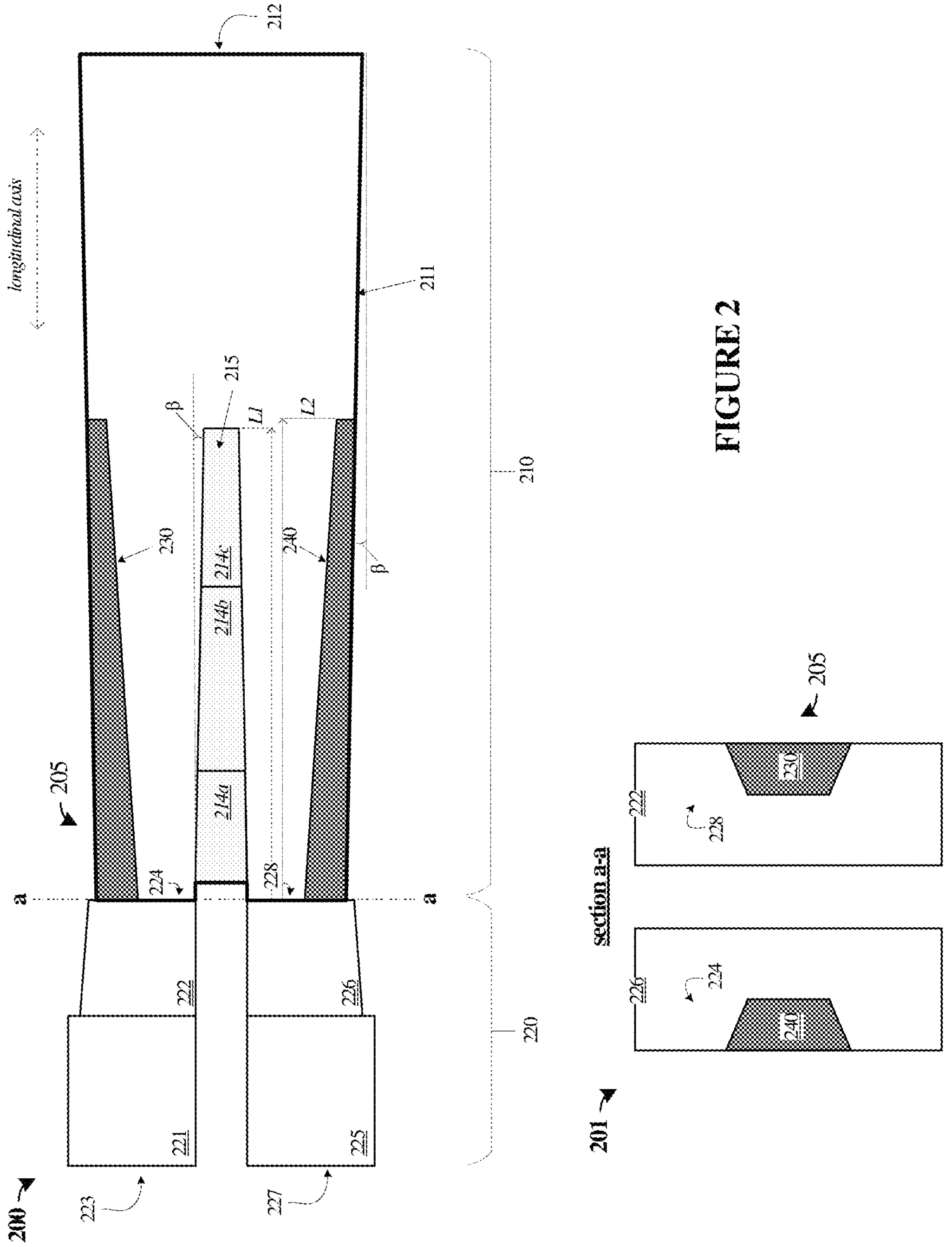
FIG. 2 illustrates an example ridged septum orthomode transducer polarizer in an implementation.

FIG. 2 is presented to illustrate enhanced septum OMT-polarizer 205 according to an example implementation. FIG. 2 includes two cross-sectional views 200 and 201, with view 200 showing a top-down cross-sectional view along a longitudinal axis and view 201 showing a cross-sectional end-view along section a-a. Septum OMT-polarizer 205 comprises two portions 210 and 220. Portion 210 comprises waveguide 211 having common/shared aperture 212, signal ports 224 and 228, septum 215, and longitudinal sidewall ridges 230 and 240. Portion 220 comprises interfacing elements that couple ports 224/228 to other RF elements, such as further waveguides which might feed waveguide 211. Ports 224/228 can also be referred to as feed points or feed ports, depending on the configuration. Common aperture 212 comprises a port that can have an example throat/opening width of 0.262 inches in some examples, such as for Ka band applications.

Portion 210 of septum OMT-polarizer 205 includes septum 215 forming a conductive ridge of stepped material that bisects a portion of waveguide 211 along a longitudinal axis for a selected length L1 shown in FIG. 2. Septum 215 includes several steps 214*a*-214*c* from a first height or thickness of step 214*a* at a 'root' of septum 215, decreasing to a final height or thickness at step 214*c* which then brings septum 215 to be coincident in height or thickness with the walls of waveguide 211 at length L1. The quantity and configuration (i.e. height, length, thickness) of steps 214*a*-214*c* can be selected to match impedance along the longitudinal axis of waveguide 211. During receive operations, septum 215 can convert a circularly polarized signal incident on common aperture 212 to a RHCP signal at port 224 and a LHCP signal at port 228, each signal at ports 224/228 having a power roughly equal to half of that incident on common aperture 212. The RHCP signal at port 224 and the LHCP signal at port 228 will also have phases (ϕ) which are +90° and −90°, respectively. During transmit operations, septum 215 can convert a RHCP signal at port 224 and a LHCP signal at port 228 to a circularly polarized signal for transmission by common aperture 212.

However, the use of a septum and waveguide with draft angles (e.g. angle β) suitable for injection molding manufacturing processes can significantly reduce the operating bandwidth for a septum OMT-polarizer, which already has a limited bandwidth. To overcome these shortcomings, sidewall ridges 230/240 are included in waveguide 211. Sidewall ridges 230/240 are located on side walls of waveguide 211 and centered on the side walls. While sidewall ridges 230/240 are not necessary to be centered vertically on the side walls of waveguide 211, the effectiveness of the sidewall ridges can be affected by placement away from center. Sidewall ridges 230/240 extend from ports 224 and 228 along the longitudinal axis of waveguide 211 for a selected length L2. While L1 and L2 may be selected to be the same or approximately same length, some examples might have different lengths which can be selected based on desired gain, impedance matching constraints, packaging constraints, and port sizes. A generally trapezoidal solid shape is employed for sidewall ridges 230/240 in FIG. 2, although variations are possible, such as triangular, half-circular, half-elliptical, or other shapes that support use of draft angles. Sidewall ridges 230/240 also incorporate draft angles β along each face. Thus, a thickness of sidewall ridges 230/240 changes over the longitudinal axis, with an initial thickness (or 'depth' into the cross-sectional area of ports 224/228) tuned based on a desired bandwidth as well as other performance characteristics. A step-down termination of sidewall ridges 230/240 to the side walls of waveguide 211 is formed at length L2 for each of sidewall ridges 230/240, although a full taper to the side walls might be included if supported by the manufacturing process. The example draft angle β does not need to be equal throughout the workpiece, but is typically selected to maintain mirror symmetry along the longitudinal axis.

Portion 220 of septum OMT-polarizer 205 comprises interfacing elements that couple ports 224 and 228 to other RF elements, such as further waveguides which might feed waveguide 211 or receive signals from waveguide 211. Specifically, portion 220 includes port interface sections 222 and 226, and also includes waveguide interface sections 221 and 225. Portion 220 comprises waveguide interface sections 221/225 that include corresponding ports or apertures 223/227 which can receive or transfer RF signals transiting through connecting waveguides (not shown), as well as act as transformer or impedance match segments. Port interface sections 222/226 and waveguide interface sections 221/225 can be employed to transition ports 224/228 to a standardized waveguide type or size, such as WR-34 or WR-42, or to provide a structural mount for septum OMT-polarizer 205. Portion 220 can comprise a ¼ wavelength (λ) transformer to a rectangular waveguide (e.g. WR-34 or WR-42). Other waveguide types can couple to waveguide interface sections 221/225, such as ridged waveguides (e.g. WRD-580).

When an injection molding or casting process is employed to form septum OMT-polarizer 205, waveguide 211 (and associated cavities), septum 215, sidewall ridges 230/240, and elements 221, 222, 225, and 226 (and associated cavities) each comprise geometry incorporating draft angles corresponding to the selected molding or casting technique, and can be formed from a single workpiece or molded piece of material. In some manufacturing scenarios, section a-a also indicates a reflection or change in draft angles corresponding to a different tooling pull or extraction direction. For example, tooling used to form portion 210 is pulled (or extracted) to the right, and tooling used to form portion 220 is pulled (or extracted) to the left. In an alternative implementation, only one sidewall ridge among 230/240 is employed. However, the resulting axial ratio, among other performance characteristics, might be affected by a lack of symmetry when only one ridge is employed. In another alternative implementation of septum OMT-polarizer 205, sidewall ridges 230/240 might instead be located sides of septum 215 instead of the side walls of waveguide 211. However, in this other alternative implementation, a first step of septum 215 might not be congruent with a full ridge length.

Figure 3:
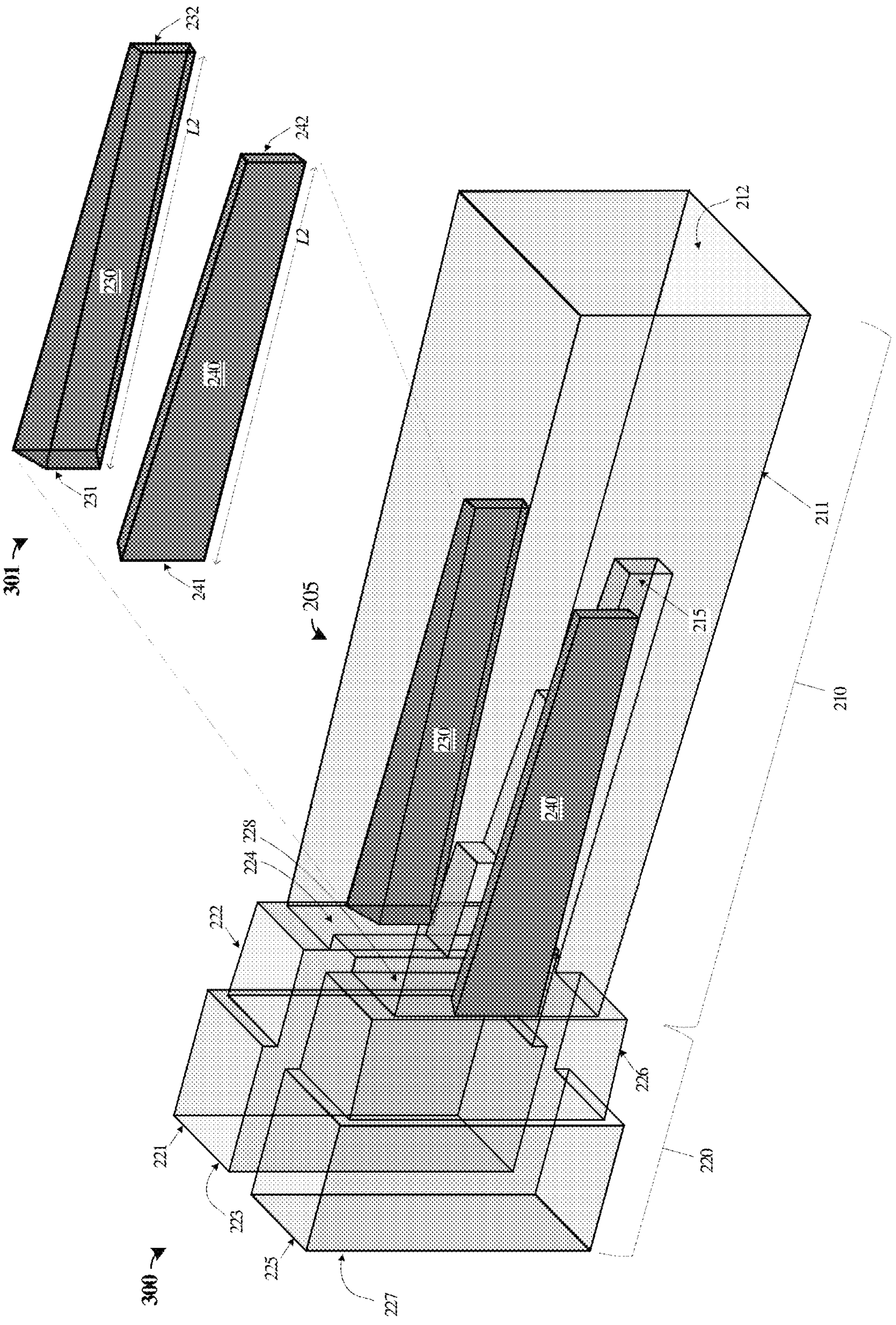
FIG. 3 illustrates an example ridged septum orthomode transducer polarizer in an implementation.
Figure 4:
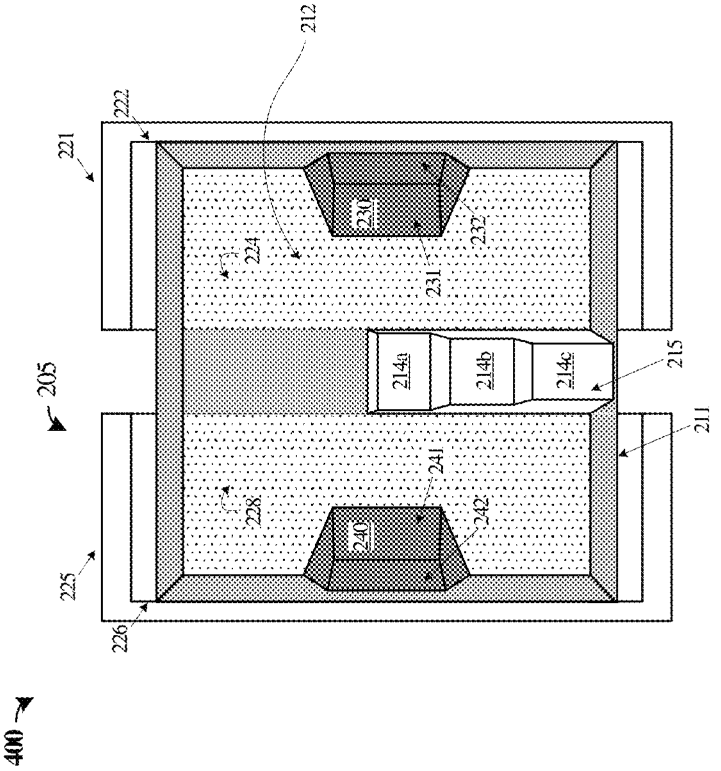
FIG. 4 illustrates an example ridged septum orthomode transducer polarizer in an implementation.

FIG. 3 illustrates additional views 300 and 301 of septum OMT-polarizer 205 with sidewall ridges 230/240. FIG. 3 includes an isometric view 300 of septum OMT-polarizer 205, as well as detailed view 301 highlighting sidewall ridges 230/240. FIG. 4 illustrates end view 400 of septum OMT-polarizer 205, when viewed end-on from common aperture 212 of waveguide 211. The internal volumes or cavities of waveguide 211 and portion 220 of septum OMT-polarizer 205 are visible in FIGS. 3 and 4. A cavity of waveguide 211 is split by septum 215 into two ports 224/228 which then transition via elements 221, 222, 225, and 226 to ports 223/227. Within the cavity of waveguide 211, stepped septum 215 is visible along with sidewall ridges 230/240.

Detailed view 301 shows sidewall ridges 230/240 separate from waveguide 211. View 301 highlights the ends of each of sidewall ridges 230/240, namely ends 231-232 of sidewall ridge 230 and ends 241-242 of sidewall ridge 240. Sidewall ridges 230/240 each comprise a first thickness proximate to a first end (231/241) tapering to a second thickness a selected longitudinal distance (L2) away from the first end terminating in a step discontinuity to a corresponding side wall. Ends 232/242 comprise these step discontinuities, which may be omitted in lieu of a taper, fillet, or chamfer to the side wall in other examples. Sidewall ridges 230/240 comprise trapezoidal prisms having faces sloped away from ends 231/241 in accordance with the aforementioned draft angle(s). Ends 231/241, which are proximate to ports 224/228, reduce cross-sectional areas of ports 224/228. Ends 231/241 can be referred to as the 'roots' of the sidewall ridges. Such reduction in cross-sectional area at the roots can be ¼ of the overall waveguide width, but may vary based on the bandwidth needed as well as other desired performance characteristics. View 201 more clearly shows this reduction in cross-sectional area of ports 224/228 from ends 231/241 of sidewall ridges 230/240.

Figure 5:
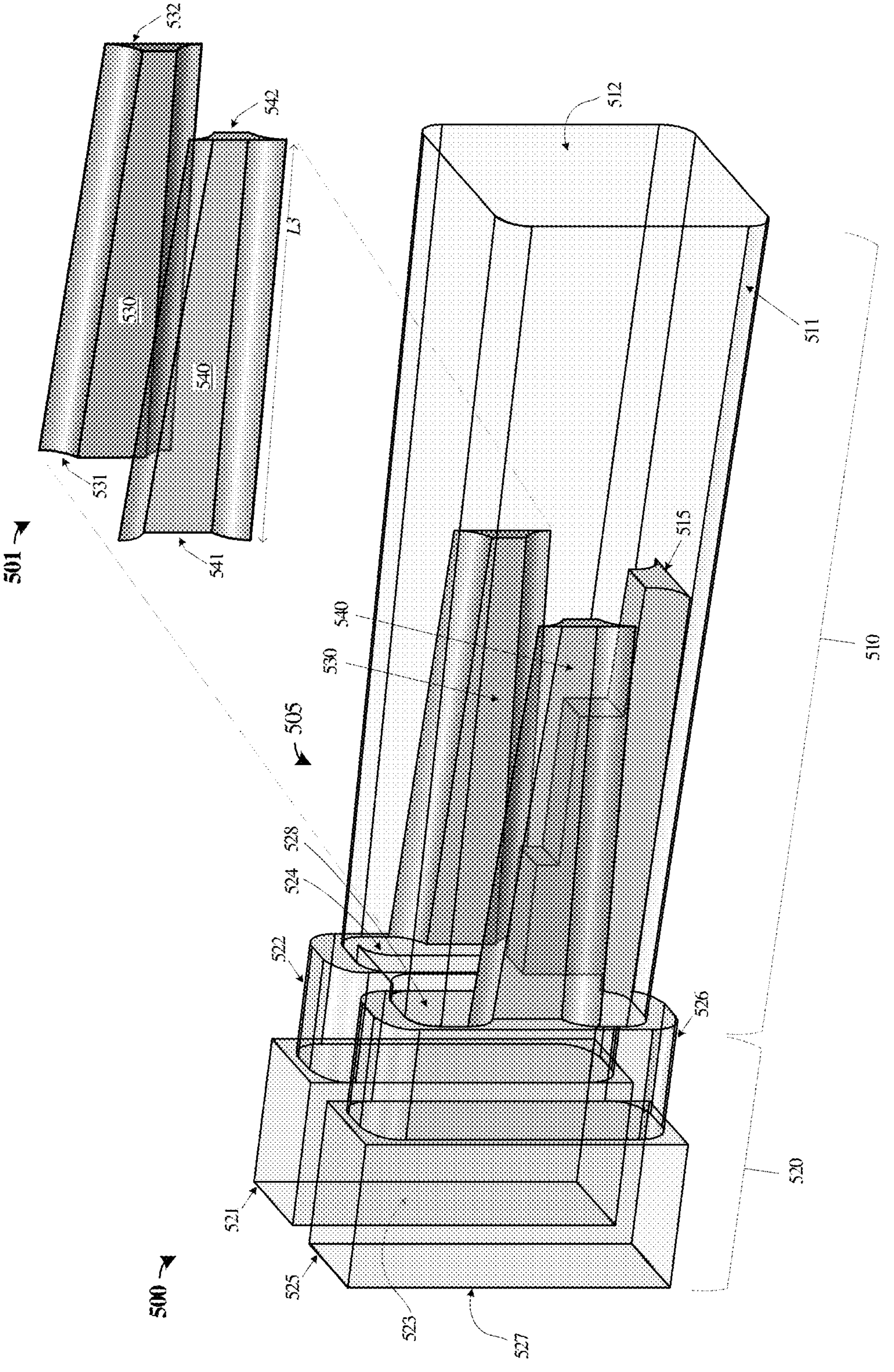
FIG. 5 illustrates an example ridged septum orthomode transducer polarizer in an implementation.
Figure 6:
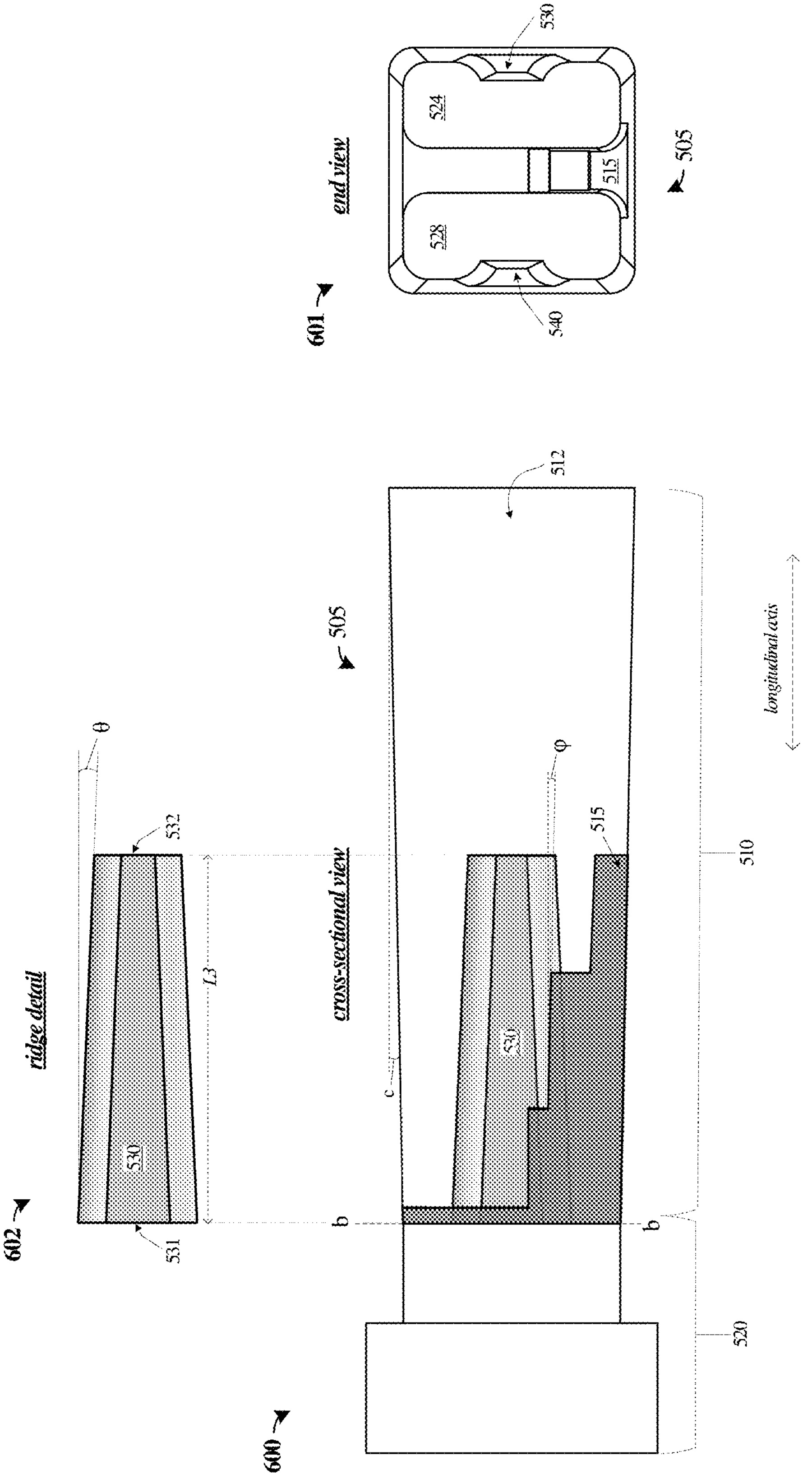
FIG. 6 illustrates an example ridged septum orthomode transducer polarizer in an implementation.

FIGS. 5 and 6 illustrate another example implementation of a septum OMT-polarizer. Specifically, several views are shown of septum OMT-polarizer 505 which includes filleted edges for sidewall ridges as well as contoured features employed for waveguides, apertures, and signal ports. Features of septum OMT-polarizer 505 can be formed from a single workpiece, such as from a common mold during an injection molding process. Conductive surface platings, coatings, or other surface treatments can be employed for interior surfaces in contact with RF signals.

Septum OMT-polarizer 505 comprises first portion 510 and second portion 520. First portion 510 comprises waveguide 511 having common aperture 512 and signal ports 524 and 528. Waveguide 511 includes stepped septum 515 and sidewall ridges 530 and 540. First portion 510 couples to second portion 520 which transitions signal ports 524/528 for coupling to further waveguides or RF elements, such as transmit and receive components. Specifically, second portion 520 includes port interface sections 522 and 526 and waveguide interface sections 521 and 525 can be employed to transition ports 524/528 to a standardized waveguide type or size, such as WR34 or WR42, or to provide a structural mount for septum OMT-polarizer 505.

Septum 515 forms a conductive ridge of stepped material that bisects a portion of waveguide 511 along a longitudinal axis for a selected length. Septum 515 includes several steps of decreasing height relative to a 'floor' of waveguide 511. The quantity and configuration of steps of septum 515 can be selected to match impedance along the longitudinal axis of waveguide 511. During receive operations, septum 515 can convert a circularly polarized signal incident on common aperture 512 to a RHCP signal at port 524 and a LHCP signal at port 528, each signal at ports 524/528 having a power roughly equal to half of that incident on common aperture 512. During transmit operations, septum 515 can convert a RHCP signal at port 524 and a LHCP signal at port 528 to a circularly polarized signal for transmission by common aperture 512. The RHCP signal at port 524 and the LHCP signal at port 528 will also have phases which are +90° and −90°, respectively.

Sidewall ridges 530/540 are centered on the side walls of waveguide 511 and extend from ports 524 and 528 along the longitudinal axis of waveguide 511 for a selected length (L3 in view 501). A generally trapezoidal solid shape is employed for sidewall ridges 530/540 in FIG. 5, with longitudinal grooves or concave fillets transitioning to a corresponding side wall. Sidewall ridges 530/540 also incorporate draft angles along each face, and a thickness of sidewall ridges 530/540 changes over the longitudinal axis. A step-down termination of sidewall ridges 530/540 to the side walls of waveguide 511 is formed at length L3 for each of sidewall ridges 530/540, although a full taper to the side walls might be included if supported by the manufacturing process. View 501 highlights the ends of each of sidewall ridges 530/540, namely ends 531-532 of sidewall ridge 530 and ends 541-542 of sidewall ridge 540. Sidewall ridges 530/540 each comprise a first thickness proximate to a first end (531/541) tapering to a second thickness a selected longitudinal distance (L3) away from the first end terminating in a step discontinuity to a corresponding side wall. Ends 532/542 comprise these step discontinuities, which may be omitted in lieu of a taper, fillet, chamfer, or bevel to the side wall. Ends 531/541, which are proximate to ports 524/528 reduce cross-sectional areas of ports 524/528.

FIG. 6 includes views 600, 601, and 602. View 600 illustrates a cross-sectional side view of septum OMT-polarizer 505, highlighting septum 515 and sidewall ridge 530. As can be seen in view 600, septum 515 has an initial height at the junction between portions 510 and 520. From here, septum 515 has a series of steps decreasing in height until termination a selected longitudinal length from the junction between portions 510 and 520. Each step has a draft angle (noted by angle 'φ' in FIG. 6) to accommodate an injection molding process. Sidewall ridge 530 is also shown having a decreasing lateral thickness (noted by angle 'θ' in FIG. 6) along the longitudinal axis until termination a selected longitudinal length (L3) from the junction between portions 510 and 520. View 602 shows angle 'θ' as well as the concave fillet features along the longitudinal axis. Ends 531/532 are also included in view 602, with end 531 proximate to the junction between portions 510 and 520 and end 532 at a selected longitudinal length L3. End view 601 shows further features of septum OMT-polarizer 505, such as the curved or filleted corners of waveguide 511, septum 515, and sidewall ridges 530/540.

When an injection molding or casting process is employed to form septum OMT-polarizer 505, waveguide 511 (and associated cavities), septum 515, sidewall ridges 530/540, and elements 521, 522, 525, and 526 (and associated cavities) each comprise geometry incorporating draft angles corresponding to the selected molding or casting technique, and can be formed from a single workpiece or molded piece of material. In some manufacturing scenarios, section b-b also indicates a reflection or change in draft angles corresponding to a different tool pull or extraction direction. For example, tooling is pulled (or extracted) to the right for portion 510, and tooling is pulled (or extracted) to the left for portion 520. Also, external features, such as the walls of waveguides, will have a first draft angle direction, while features internal to the waveguides will have a mirrored or opposite draft angle direction. This change in draft angle direction accommodates mold elements (e.g. die or mandrel) inserted into waveguide 511 during an injection molding process. Thus, external features will generally increase in size, while internal features will generally decrease in size over the pull direction.

Figure 7:
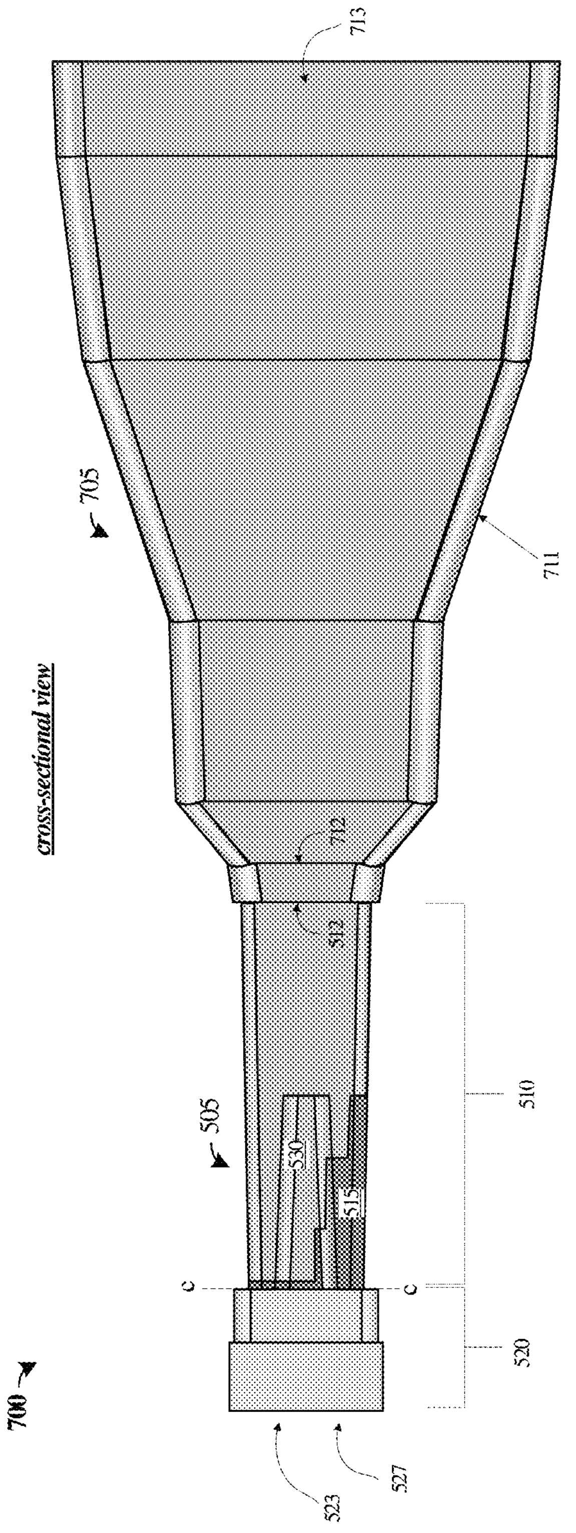
FIG. 7 illustrates an example horn antenna that employs a ridged septum orthomode transducer polarizer in an implementation.

FIG. 7 illustrates an example horn antenna 700 that employs septum OMT-polarizer 505. Specifically, horn antenna 700 comprises septum OMT-polarizer 505 coupled to horn element 705. FIG. 7 is a cross-sectional view having portions 510 and 520 of septum OMT-polarizer 505 highlighting septum 515 and sidewall ridge 530, along with a cross-section of horn element 705. Horn element 705 includes horn walls 711, port 712, and aperture 713. Although septum OMT-polarizer 505 is included in horn antenna 700, it should be understood that other septum OMT-polarizer configurations can be employed, such as septum OMT-polarizer 205.

Horn antenna 700 can be formed as a single part or from a single workpiece, such as with an injection molding technique or casting process. As with septum OMT-polarizer 505, horn element 705 can also include draft angles which accommodate an injection molding process. In other examples, horn element 705 might be formed as a separate piece from septum OMT-polarizer 505 and joined at the interface between aperture 512 and port 712. Various surface platings, coatings, or other surface treatments can be employed to form a conductive layer on RF signal portions of horn antenna 700, such as an interior portion of horn element 705 and corresponding interior portions of septum OMT-polarizer 505.

When an injection molding or casting process is employed to form horn element 705 (and associated cavity), septum OMT-polarizer 505, waveguide 511 (and associated cavities), septum 515, sidewall ridges 530/540, and elements 521, 522, 525, and 526 (and associated cavities) each comprise geometry incorporating draft angles corresponding to the selected molding or casting technique, and can be formed from a single workpiece or molded piece of material. In some manufacturing scenarios, section c-c also indicates a reflection or change in draft angles corresponding to a different tooling pull or extraction direction. For example, tooling is pulled to the right for portion 510 and horn element 705, and tooling is pulled to the left for portion 520.

Figure 8:
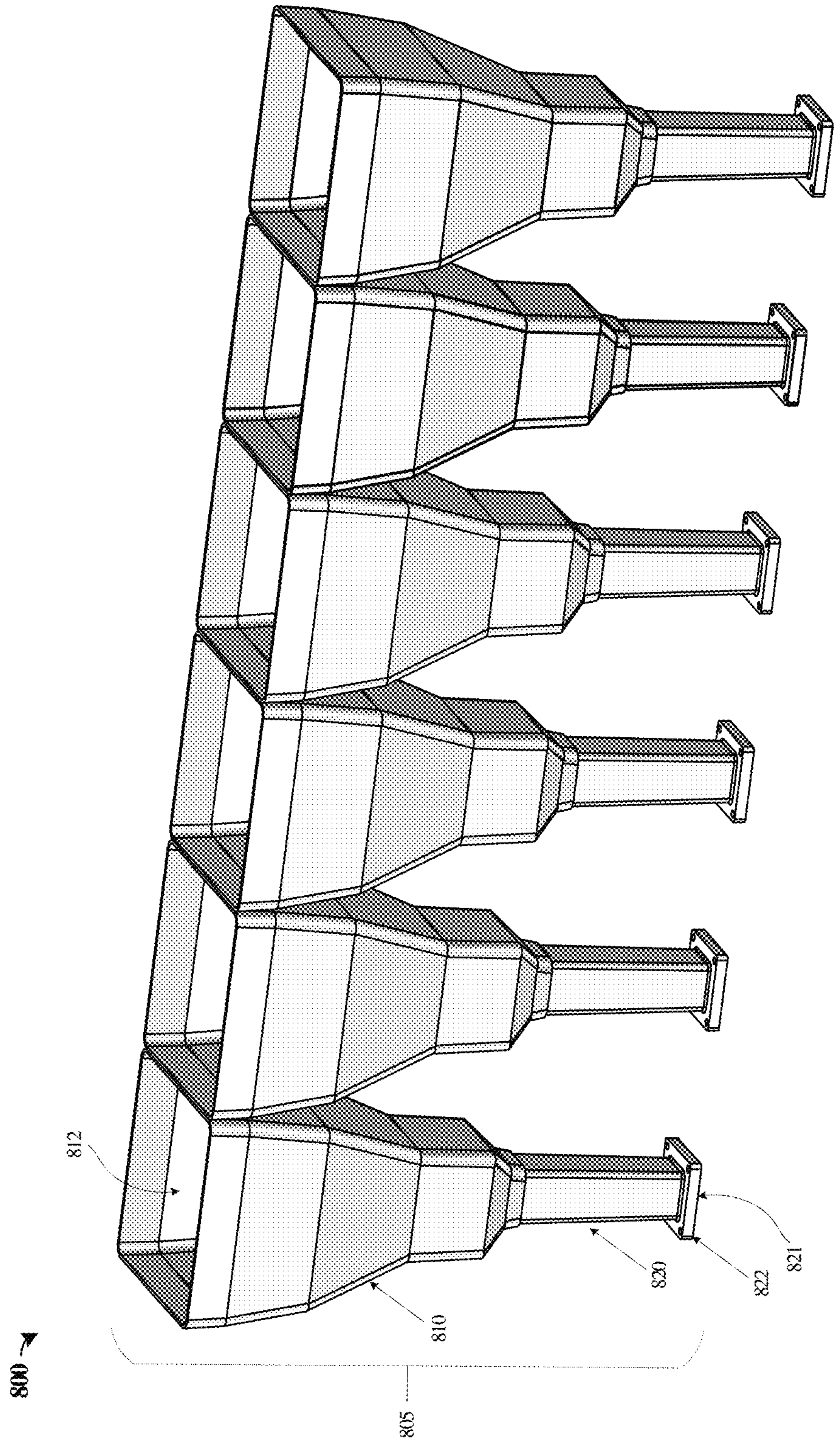
FIG. 8 illustrates an example horn antenna array that employs ridged septum orthomode transducer polarizers in an implementation.

Horn antenna 700 can be formed into an array of many horn antennas. This array can be deployed to form beam-forming arrays or electronically steerable arrays, (ESAs), among other configurations. FIG. 8 illustrates one example array 800 having six (6) instances of horn antennas. Each horn antenna in FIG. 8 includes a corresponding horn element and septum OMT-polarizer, indicated as elements 810 and 820 for horn antenna 805. Also included for each horn antenna is horn aperture 812 and horn port 821. Horn antenna 805 couples to further RF components, such as waveguides, at flange 822. Many instances of array 800 can be employed to form a larger array having several rows and columns of horn antennas.

In operation, each horn antenna in array 800 can be employed to propagate an RF signal over a longitudinal axis from ports to apertures, or vice-versa. During receive operations, the structure and shape of the associated septum OMT-polarizers separate an incoming signal received at horn aperture into signal portions having different polarizations, namely RHCP and LHCP at different ports. Since each of the ports are coupled to separate waveguides, the associated signal portions propagate to circuitry and RF elements which handle the corresponding portion. A similar operation is conducted for transmit operations, where a RHCP signal and a LHCP signal are introduced at corresponding ports of each horn antenna which propagates longitudinally along the corresponding septum OMT-polarizer and the signals are combined along the path toward the horn aperture. Various phase, power, or timing differences among each horn antenna of the array can be used to alter RF propagation properties, such as directionality or RF lobe configurations.

Figure 9:
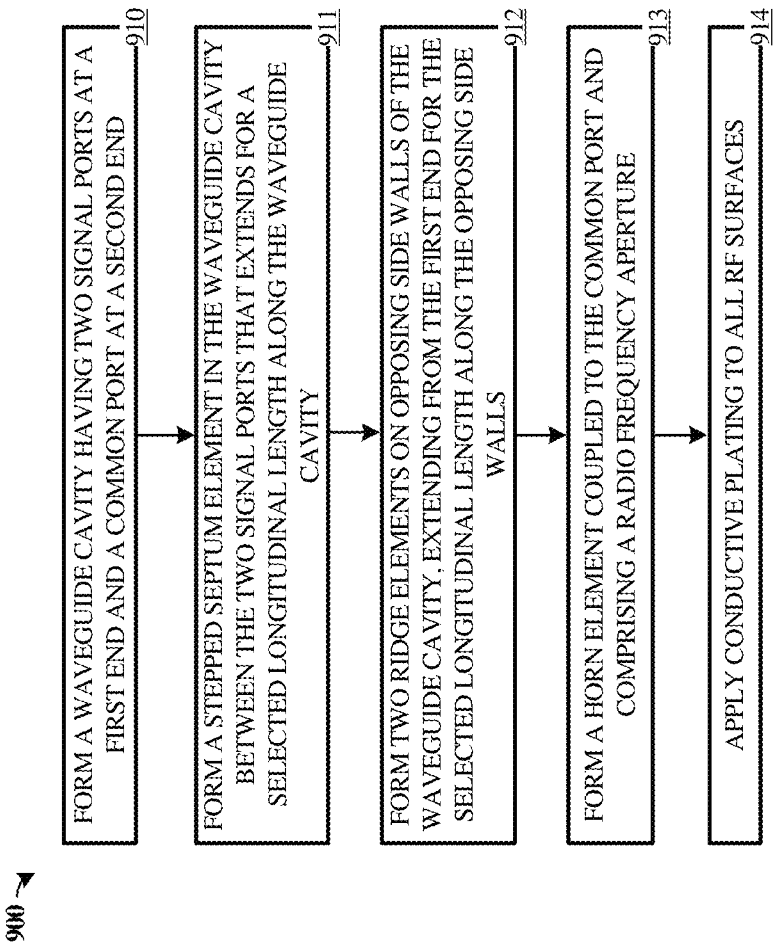
FIG. 9 illustrates an example method of manufacturing a ridged septum orthomode transducer polarizer in an implementation.

Various manufacturing techniques can be employed to form the various septum OMT-polarizers and horn antennas in the preceding Figures. Some techniques and operations have been noted above. FIG. 9 includes additional operations 900 that illustrate some example manufacturing methods and associated techniques to form horn antenna 700. In operation 910, waveguide cavity 511 is formed having two signal ports 524/528 at a first end and a common port or aperture 512 at a second end. A stepped septum element 515 is formed (911) in the waveguide cavity 511 between the two signal ports that extends for a selected longitudinal length along the waveguide cavity 511. Two ridge elements 530/540 are formed (912) on opposing side walls of the waveguide cavity, extending from the first end for the selected longitudinal length along the opposing side walls. Optionally, a horn element 705 can be formed (913) coupled to the common port 512 and comprising a radio frequency aperture 713.

As mentioned above, an injection molding or casting process can be employed to form the various elements of horn antenna 700, and each element can comprise geometry incorporating draft angles corresponding to the selected molding or casting technique. This provides for formation from a single workpiece or molded piece of material. Different tooling pull or extraction directions can be employed in a single workpiece, while having draft angles corresponding to the particular tooling pull direction. These draft angles of approximately 1° or 2° are typically a requirement of the manufacturing process tooling to prevent material overhangs or parallel surfaces in order to release the workpiece from a mold or die.

Once the elements of septum OMT-polarizer 505 and horn antenna 700 have been manufactured, operation 914 indicates that surface coatings or platings can be applied to all interior surfaces in contact with RF signals. These surfaces include sidewall ridges, septum surfaces, interior surfaces of ports, interior surfaces of apertures, and interior walls of waveguides. In some examples, interior cavities of septum OMT-polarizer 505 or horn antenna 700 are injection molded oversized and then plated selectively on RF-contacting surfaces. The selective plating process can achieve +/−0.001 inch tolerances for an injection molded part, and thus the oversizing of cavities can provide for correct sizing once plated.

Materials employed for the elements of septum OMT-polarizer 505 or horn antenna 700 or any of the septum OMT-polarizers discussed herein can include any injection-moldable material. Examples include plastics, polymers, carbon composites, polyamide, acrylic, polycarbonate, polyoxymethylene, polystyrene, acrylonitrile butadiene styrene (ABS), polypropylene, polyethylene, polyurethane, thermoplastic rubber, including combinations thereof. Additionally, various additives can be included in the injected material, such as stabilizers, glass or organic fibers, structural elements, lubricants, mold release agents, or other additives. The material can be injected via at least one port into a mold or die which forms the shapes and cavities of the associated elements. Conductive surface treatments include various platings, including conductive materials, metallic substances, metals, metal alloys, and the like, such as aluminum, copper, silver, gold, or other similar metals or associated combinations.

Figure 10:
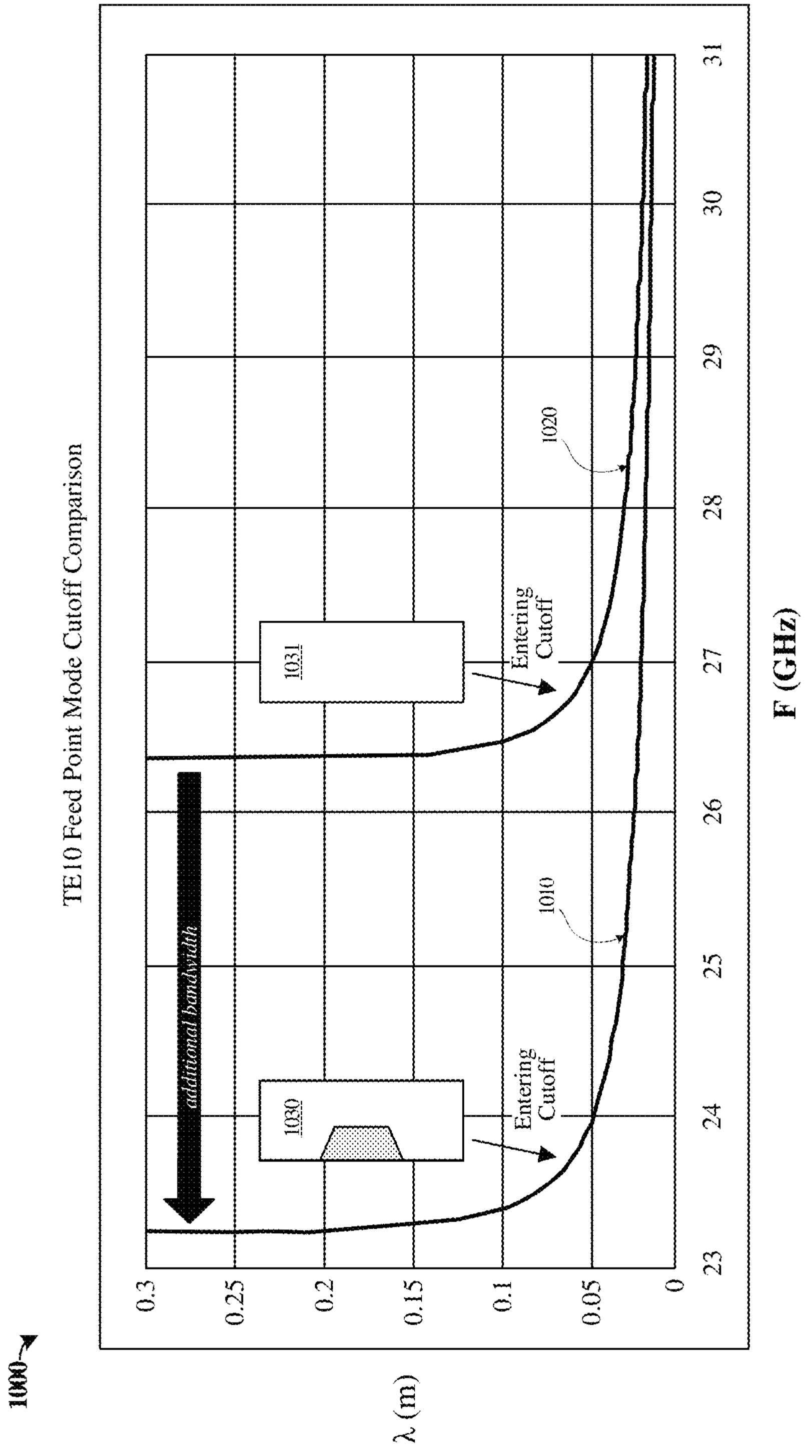
FIG. 10 illustrates performance characteristics of a ridged septum orthomode transducer polarizer in an implementation.
Figure 11:
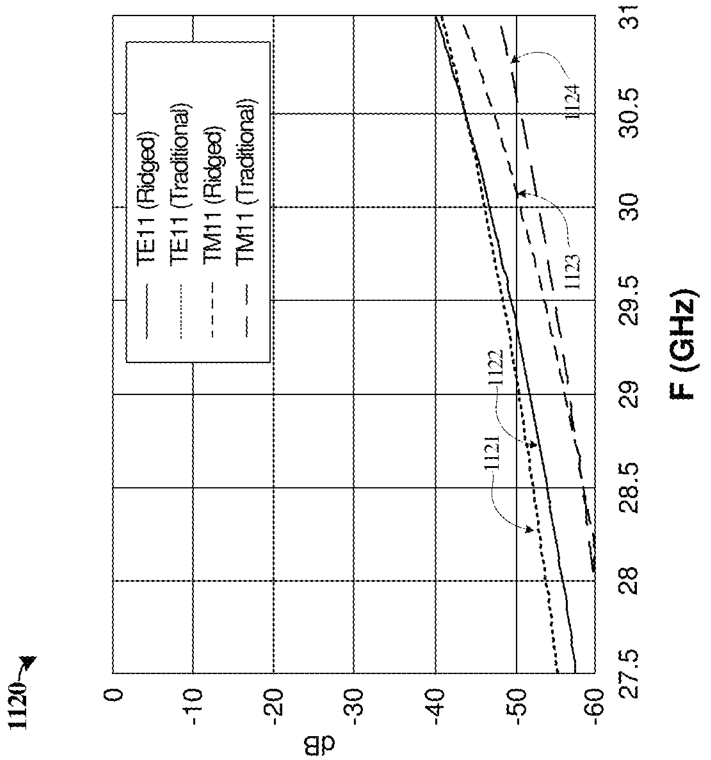
FIG. 11 illustrates performance characteristics of a ridged septum orthomode transducer polarizer in an implementation.
Figure 11:
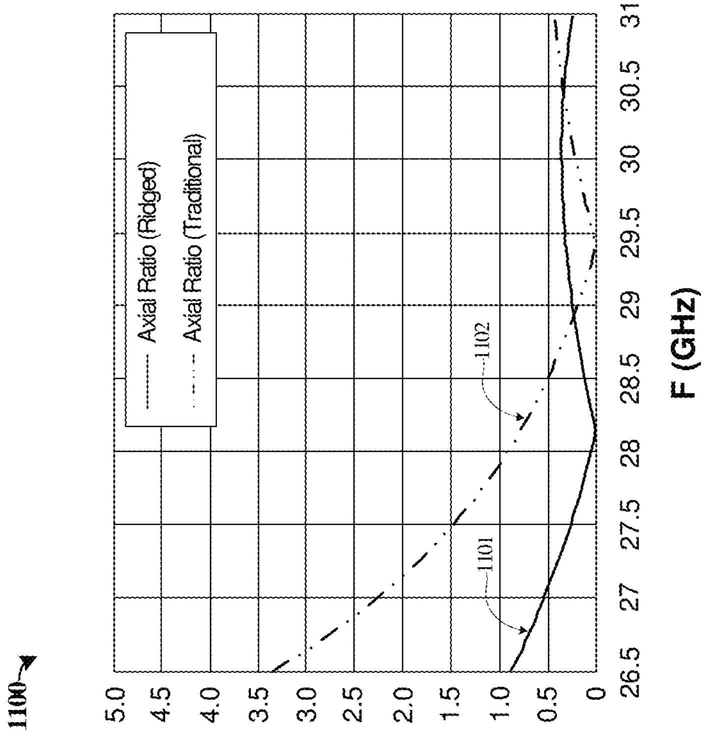

Turning now to some example performance characteristics for septum OMT-polarizers discussed herein, FIGS. 10 and 11 are presented. FIG. 10 illustrates a performance comparison between use of longitudinal sidewall ridges versus having no sidewall ridges in a septum OMT-polarizer. As can be seen in graph 1000 of FIG. 10, sidewall ridges are employed in example cross-section 1030, while no sidewall ridges are employed in example cross-section 1031. Example cross-section 1031 represents a port of a conventional or traditional septum OMT-polarizer, while cross-section 1030 represents an enhanced septum OMT-polarizer as discussed herein.

Graph 1000 indicates a TE10 feed point mode cutoff comparison between septum OMT-polarizers having cross-section 1030 (curve 1010) and cross-section 1031 (curve 1020). A vertical axis of graph 1000 relates to wavelength (λ) in meters for a waveguide, and a horizontal axis relates to frequency in gigahertz (GHz). As can be seen for curve 1010, the use of sidewall ridges creates modal separation and unlocks more bandwidth for a given septum OMT-polarizer. Specifically, curve 1010 has a cutoff around 24 GHz, while curve 1020 has a cutoff around 27 GHz—indicating a 3 GHz increase in bandwidth when using the sidewall ridges discussed herein.

FIG. 11 illustrates further performance comparisons between use of longitudinal sidewall ridges versus having no sidewall ridges ('traditional') in a septum OMT-polarizer. Graph 1100 indicates a comparison of axial ratios between traditional injection molded septum OMT-polarizer (curve 1102) and sidewall ridged injection molded septum OMT-polarizer (curve 1101). A vertical axis of graph 1100 relates to axial ratio in dB, while a horizontal axis relates to frequency in GHz. Thus, graph 1100 shows axial ratio performance between the two types of septum OMT-polarizers, which indicates a larger frequency range of near-symmetric axial ratios achieved for sidewall ridged septum OMT-polarizers. Since axial ratio is a metric comparing RH and LH polarization ratios, it is desirable to be symmetric over a larger bandwidth. Curve 1102 shows lesser performance over a given frequency range for traditional non-ridged septum OMT-polarizers with draft angles, namely the TE10 mode approaching cutoff at a much higher frequency.

Graph 1120 indicates a comparison between example propagation modes between use of longitudinal sidewall ridges versus having no sidewall ridges ('traditional') in a drafted septum OMT-polarizer. A vertical axis of graph 1120 relates to higher-order modes suppression levels in dB, while a horizontal axis relates to frequency in GHz. Graph 1120 thus shows a comparison of propagation modes (TE11 and TM11) between traditional injection molded septum OMT-polarizers and sidewall ridged injection molded septum OMT-polarizers. As can be seen by curves 1122 and 1123, adding ridges establishes suppression of higher order modes effectively with respect to 'traditional' curves 1121 and 1124. Although higher order mode content is below 40 dB for both approaches, the use of sidewall ridges achieve double the bandwidth while maintaining around 0.50 dB of axial ratio.

Thus, the examples herein discuss several enhanced septum OMT polarizer configurations with sidewall ridges which increase achievable bandwidth in the presence of draft angles by creating more separation between the TE10 and TE11/TM11 mode cutoffs. The sidewall ridges create modal separation, resulting in a large increase in bandwidth, and can be manufactured using an injection molding process. A septum OMT polarizer using these sidewall ridges can be formed as a single part via the injection molding process while still achieving performance greater than traditional designs. Moreover, a horn element can be formed form a single workpiece along with the septum OMT polarizer, resulting in further feed complexity reduction and weight reduction by eliminating fasteners, machined parts, and other associated complexity.

It should be understood that various communication bands and frequencies can be employed for the septum OMT-polarizers discussed herein, with corresponding geometry scaling to suit the frequency ranges. For example, the septum OMT-polarizers can support a frequency range corresponding to the Institute of Electrical and Electronics Engineers (IEEE) bands of S band, L band, C band, X band, Ku band, Ka band, V band, W band, among others, including combinations thereof. Other example RF frequency ranges and service types include ultra-high frequency (UHF), super high frequency (SHF), extremely high frequency (EHF), or other parameters defined by different organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

a waveguide cavity having two signal ports at a first longitudinal end and a common port at a second longitudinal end opposite the first longitudinal end;

a septum element disposed longitudinally for a septum length in the waveguide cavity starting from the first longitudinal end between the two signal ports and comprising a series of step downs established over the septum length; and ridge elements positioned on opposing side walls of the waveguide cavity each extending longitudinally for the septum length and comprising a first thickness proximate to the first longitudinal end smoothly tapering to a second thickness at a selected longitudinal distance away from the first longitudinal end and terminating in a step discontinuity to a corresponding side wall that establishes placement in the waveguide cavity as approximately congruent with the septum element.

2. The apparatus of claim 1, wherein the waveguide cavity, the septum element, and the ridge elements each comprise geometry incorporating draft angles corresponding to a molding or casting technique.

3. The apparatus of claim 1, wherein the ridge elements comprise trapezoidal prisms having both lateral thicknesses and thicknesses from the side walls smoothly tapered away from the first longitudinal end.

4. The apparatus of claim 1, wherein the ridge elements each comprise longitudinal fillet features transitioning to an outer face congruent with a corresponding side wall.

5. The apparatus of claim 1, wherein the two signal ports, the common port, the waveguide cavity, the septum element, and the ridge elements are formed from a single workpiece of material.

6. The apparatus of claim 1, wherein end portions of the ridge elements proximate to the first longitudinal end reduce cross-sectional areas of the two signal ports.

7. The apparatus of claim 1, further comprising:

a horn element coupled to the common port and comprising a radio frequency aperture.

8. The apparatus of claim 7, wherein the horn element, the two signal ports, the common port, the waveguide cavity, the septum element, and the ridge elements are formed from a single workpiece of material.

9. The apparatus of claim 1, wherein the apparatus forms at least a portion of a septum orthomode transducer polarizer having only three ports corresponding to the two signal ports and the common port; and wherein a first of the two signal ports corresponds to a right hand circularly polarized port and a second of the two signal ports corresponds to a left hand circularly polarized port.

10. A method, comprising:

forming a waveguide cavity having two signal ports at a first longitudinal end and a common port at a second longitudinal end;

forming a stepped septum element in the waveguide cavity extending for a septum length and starting from the first longitudinal end between the two signal ports; and forming two ridge elements on opposing side walls of the waveguide cavity, each extending longitudinally for the septum length comprising a first thickness proximate to the first longitudinal end smoothly tapering to a second thickness at a selected longitudinal length away from the first longitudinal end and terminating in a step discontinuity to a corresponding side wall that establishes placement in the waveguide cavity as approximately congruent with the stepped septum element.

11. The method of claim 10, further comprising:

forming the waveguide cavity, the two signal ports, the common port, the septum element, and the ridge elements from a single molded workpiece; and incorporating draft angles corresponding to a molding or casting technique into geometries of the waveguide cavity, the septum element, and the ridge elements.

12. The method of claim 10, wherein the ridge elements comprise trapezoidal prisms having both lateral thicknesses and thicknesses from the side walls smoothly tapered away the first longitudinal end.

13. The method of claim 10, wherein the ridge elements each comprise longitudinal fillet features transitioning to an outer face congruent with a corresponding side wall.

14. The method of claim 10, further comprising:

forming a horn element coupled to the common port and comprising a radio frequency aperture.

15. An antenna array, comprising:

a plurality of horn antennas each having a horn element coupled to a septum orthomode transducer polarizer at a common port;

each septum orthomode transducer polarizer comprising:

a waveguide cavity with two signal ports at a first longitudinal end and the common port at a second longitudinal end;

a septum element disposed longitudinally for a septum length in the waveguide cavity starting from the first longitudinal end between the two signal ports and comprising a series of step downs established over the septum length; and ridge elements positioned on side walls of the waveguide cavity, each extending longitudinally for the septum length and comprising a first thickness proximate to the first longitudinal end smoothly tapering to a second thickness a selected longitudinal distance away from the first longitudinal end terminating in a step discontinuity to a corresponding side wall that establishes placement in the waveguide cavity as generally congruent with the septum element.

16. The antenna array of claim 15, wherein the ridge elements comprise trapezoidal prisms having both lateral thicknesses and thicknesses from the side walls smoothly tapered away the first longitudinal end.

17. The antenna array of claim 15, wherein each of the horn elements and the septum orthomode transducer polarizers are formed from a single injection molded part.

* * * * *